(12) United States Patent
Hundegger

(10) Patent No.: US 8,910,774 B2
(45) Date of Patent: Dec. 16, 2014

(54) WOODWORKING FACILITY

(76) Inventor: Hans Hundegger, Hawangen (DE)

( * ) Notice: Subject to any disclaimer, the term of this patent is extended or adjusted under 35 U.S.C. 154(b) by 0 days.

(21) Appl. No.: 13/594,794

(22) Filed: Aug. 25, 2012

(65) Prior Publication Data

US 2013/0056334 A1    Mar. 7, 2013

(30) Foreign Application Priority Data

Aug. 27, 2011    (DE) .................... 20 2011 105 077 U

(51) Int. Cl.
| | | |
|---|---|---|
| B65G 21/20 | (2006.01) | |
| B65G 15/60 | (2006.01) | |
| B27C 1/12 | (2006.01) | |
| B23Q 7/03 | (2006.01) | |
| B27B 25/04 | (2006.01) | |

(52) U.S. Cl.
CPC ... *B27C 1/12* (2013.01); *B23Q 7/03* (2013.01); *B27B 25/04* (2013.01); *B65G 15/60* (2013.01); *B65G 21/20* (2013.01); *B65G 2201/0282* (2013.01)
USPC ..................... 198/626.5; 198/626.6

(58) Field of Classification Search
USPC ............... 198/842, 843, 833, 626.1–626.6
See application file for complete search history.

(56) References Cited

U.S. PATENT DOCUMENTS

| | | | |
|---|---|---|---|
| 2,135,763 A | | 11/1938 | Nicholson |
| 2,387,446 A | * | 10/1945 | Herz ........................... 198/626.6 |
| 3,386,565 A | * | 6/1968 | Carter ........................ 198/626.6 |
| 3,723,230 A | * | 3/1973 | Troutner ....................... 156/580 |
| 3,844,398 A | * | 10/1974 | Pinat ......................... 198/626.6 |
| 3,915,290 A | * | 10/1975 | Zuercher et al. ........... 198/626.6 |
| 3,967,720 A | * | 7/1976 | Arieh ............................. 198/833 |
| 4,316,411 A | * | 2/1982 | Keaton ............................ 100/50 |
| 4,364,696 A | | 12/1982 | Syarto et al. |
| 4,611,646 A | * | 9/1986 | Wassmer et al. ........... 144/117.1 |
| 4,655,291 A | | 4/1987 | Cox |
| 5,094,340 A | * | 3/1992 | Avakov ...................... 198/626.1 |
| 5,174,437 A | * | 12/1992 | Burger ......................... 198/842 |
| 5,415,274 A | | 5/1995 | Krismanth et al. |

(Continued)

FOREIGN PATENT DOCUMENTS

| | | |
|---|---|---|
| DE | 7320344 | 9/1973 |
| DE | 8004412 | 6/1980 |

(Continued)

OTHER PUBLICATIONS

Russian Office Action dated Nov. 26, 2013 for Application No. 12180284.7-1262.

(Continued)

*Primary Examiner* — Mark A Deuble
(74) *Attorney, Agent, or Firm* — Fleit Gibbons Gutman Bongini & Bianco PL; Martin Fleit; Paul D. Bianco

(57) ABSTRACT

A woodworking facility with a workpiece support and a belt or chain arrangement for registering the movement of a workpiece that lies on the workpiece support and is transported thereon in order to be processed. The belt or chain arrangement includes a belt or chain that is guided over at least two deflection pulleys and is designed for contacting the workpiece transverse to the moving direction of the belt or the chain by a pressing device assigned to the belt or chain. The pressing device includes several pressing elements that are moved together with the belt or chain in the moving direction thereof.

18 Claims, 3 Drawing Sheets

(56) References Cited

U.S. PATENT DOCUMENTS

| | | | |
|---|---|---|---|
| 5,492,216 A * | 2/1996 | McCoy et al. | 198/626.5 |
| 5,775,417 A | 7/1998 | Council | |
| 5,875,697 A * | 3/1999 | Cole et al. | 83/435.2 |
| 6,186,732 B1 | 2/2001 | Brown et al. | |
| 6,296,107 B1 * | 10/2001 | Baumgartner-Pichelsberger | 198/626.6 |
| 6,609,566 B2 | 8/2003 | Perio, Jr. | |
| 6,880,629 B2 | 4/2005 | Schroeder | |

FOREIGN PATENT DOCUMENTS

| | | |
|---|---|---|
| DE | 2927751 A1 | 1/1981 |
| DE | 3143867 | 5/1983 |
| DE | 29701903 | 3/1997 |
| DE | 29701963 | 3/1997 |
| DE | 20203488 U1 | 9/2002 |
| GB | 1411071 | 10/1975 |
| IT | 1213903 | 1/1990 |
| SU | 1027116 | 7/1983 |

OTHER PUBLICATIONS

Decision on Granting a Patent for Invention from the Russian Patent Office dated Feb. 27, 2014.

European Search Report dated Dec. 4, 2012.

Russian Office Action dated Jan. 13, 2014 for application No. 2012136063/13.

Decision on Granting a Patent for Invention from the Russian Patent Office dated Mar. 28, 2014 for application No. 2012136063/13.

European Search Report dated Dec. 4, 2012 for Application No. 12180284.7-1262.

\* cited by examiner

WOODWORKING FACILITY

CROSS REFERENCE TO RELATED APPLICATIONS

This application claims priority under 35 U.S.C. §119 to German Patent Application No. 20 2011 105 077.0 filed Aug. 27, 2011, the entire contents of which are incorporated herein by reference.

FIELD OF THE INVENTION

The invention pertains to a woodworking facility.

BACKGROUND OF THE INVENTION

DE 202 03 488 U1 discloses a woodworking facility in which the movement of the workpiece is registered by means of a belt arrangement with a belt or band that is guided over deflection pulleys. In this case, a measuring belt is guided over several separate pulleys parallel to a driving band that is intended for the transport of the workpieces. Flat spring-loaded pressing rails are arranged on the rear side of the measuring belt toward the workpiece side. The measuring belt is pressed against the workpiece from inside by means of the spring-loaded pressing rails. However, since the measuring belt is moved along the stationary pressing rails, the measuring belt is subjected to significant stress due to the relative movement between the measuring belt and the spring-loaded pressing rails and the thusly caused friction such that rapid wear of the measuring belt and consequently slippage thereof may occur.

The invention is based on the objective of developing a woodworking facility of the initially cited type that makes it possible to respectively press the belt or the chain against the workpiece to be moved in a slip-free fashion with the least friction possible.

This objective is attained with a woodworking facility with the characteristics, practical enhancements, and advantageous embodiments in accordance with the disclosure.

SUMMARY OF THE INVENTION

In the inventive woodworking facility, the pressing device features several pressing elements that are moved together with the belt or the chain in the moving direction thereof. Since the pressing elements move with the belt or the chain, the belt or the chain can be respectively pressed against the workpiece in order to produce a slip-free connection therewith, namely without any sliding friction occurring between the pressing elements and the belt or the chain. In this way, it is possible, e.g., to determine the movement of the workpiece in a precise and slip-free fashion.

In a particularly practical embodiment of the invention, the pressing elements are interconnected into an endless chain and guided over at least two pocket wheels. The two pocket wheels lie in one plane and preferably are arranged in a plane between two upper deflection pulleys of the belt in such a way that the pressing elements come in contact with the inner side of the belt section extending between the two deflection pulleys. In an advantageous embodiment, the pressing elements may be interconnected, e.g., by means of link plates.

The pressing elements are preferably pressed against the inner side of the belt by means of a pressure plate. The pressure plate may be arranged between the pocket wheels and realized such that the pressing elements are pressed against the inner side of the belt when they pass over the pressure plate and thusly press the belt, e.g., against the underside of a workpiece. The pressure plate may be realized in a ramp-shaped fashion for this purpose. The pressure plate may also be pivotable about a horizontal axis. In this way, the pressing elements can also be adequately pressed against irregular workpieces.

In order to achieve the least friction possible between the pressing elements and the pressure plate, rotatably supported rollers may be arranged on the pressing elements or on the connecting elements between the pressing elements in order to realize the support on the pressure plate.

In a particularly practical embodiment, the belt is guided over two deflection pulleys that are arranged in one plane and over a third deflection pulley, wherein the third deflection pulley may be arranged on the free end of a pivotably supported motion link.

The deflection pulleys and the pressing device may be arranged on a support and vertically moved by means of this support. This makes it possible to realize an adjustment against the workpiece.

The above-described belt or chain arrangement can preferably be used for registering the movement of a workpiece in a board processing facility, a joinery facility or a similar woodworking facility. For this purpose, the belt or the chain is pressed, e.g., against the underside of a workpiece that is moved in the longitudinal direction on a workpiece support by means of the pressing elements that move with the belt or the chain. A sensor or another suitable device may be arranged on at least one of the pulleys of the belt in order to register its rotational movement. The movement of the workpiece therefore can be registered and measured in a slip-free fashion by registering the rotational movement of the pulley that is driven by the workpiece via the belt or a chain. However, the movement of the belt or the chain can also be directly registered with other suitable measuring devices. It would also be possible, e.g., to register the number of teeth of a toothed belt moving past a suitable detector and to use this number for the direct measurement of the belt movement. However, other measuring devices would also be suitable for registering the belt or chain movement.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically.

Figure 1:
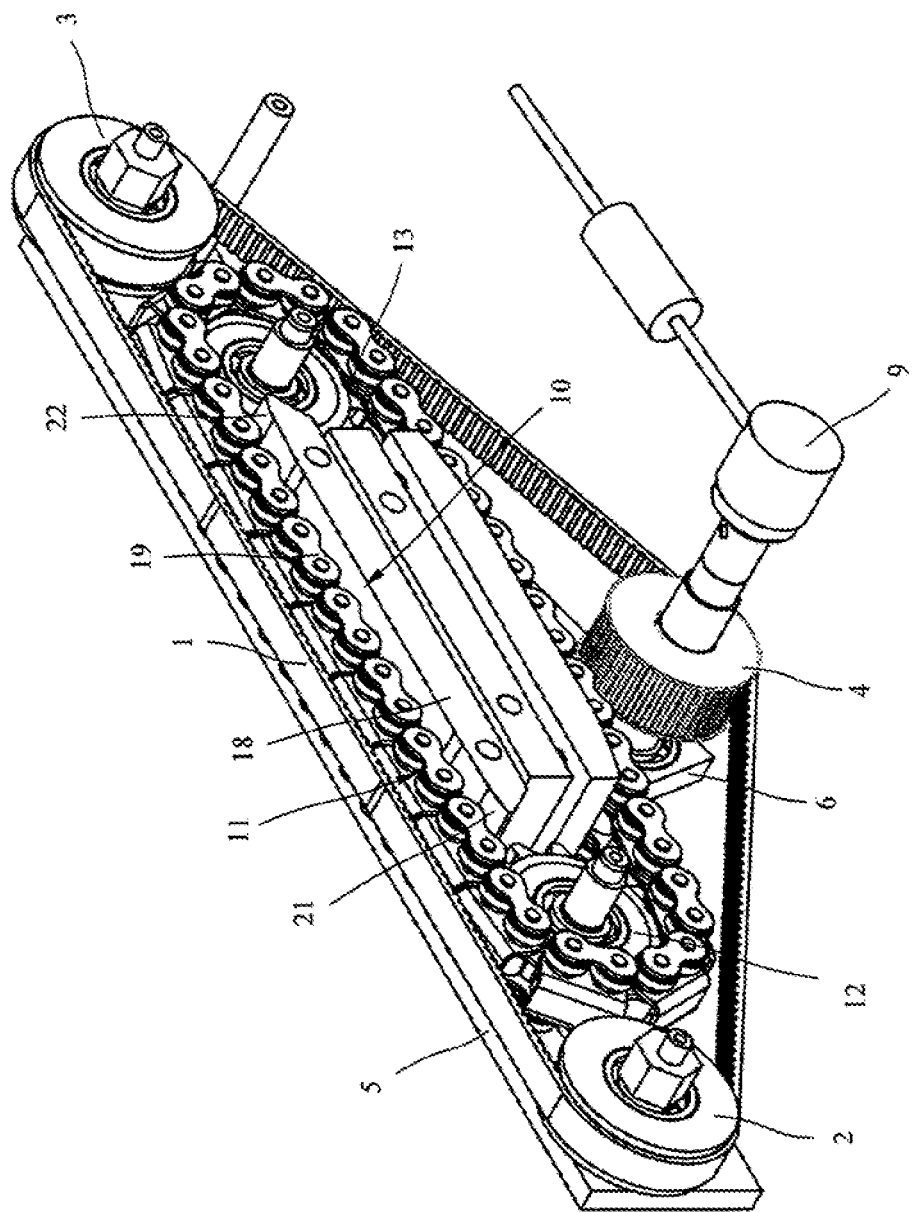
FIG. 1 is a perspective view of an inventive belt arrangement.
Figure 2:
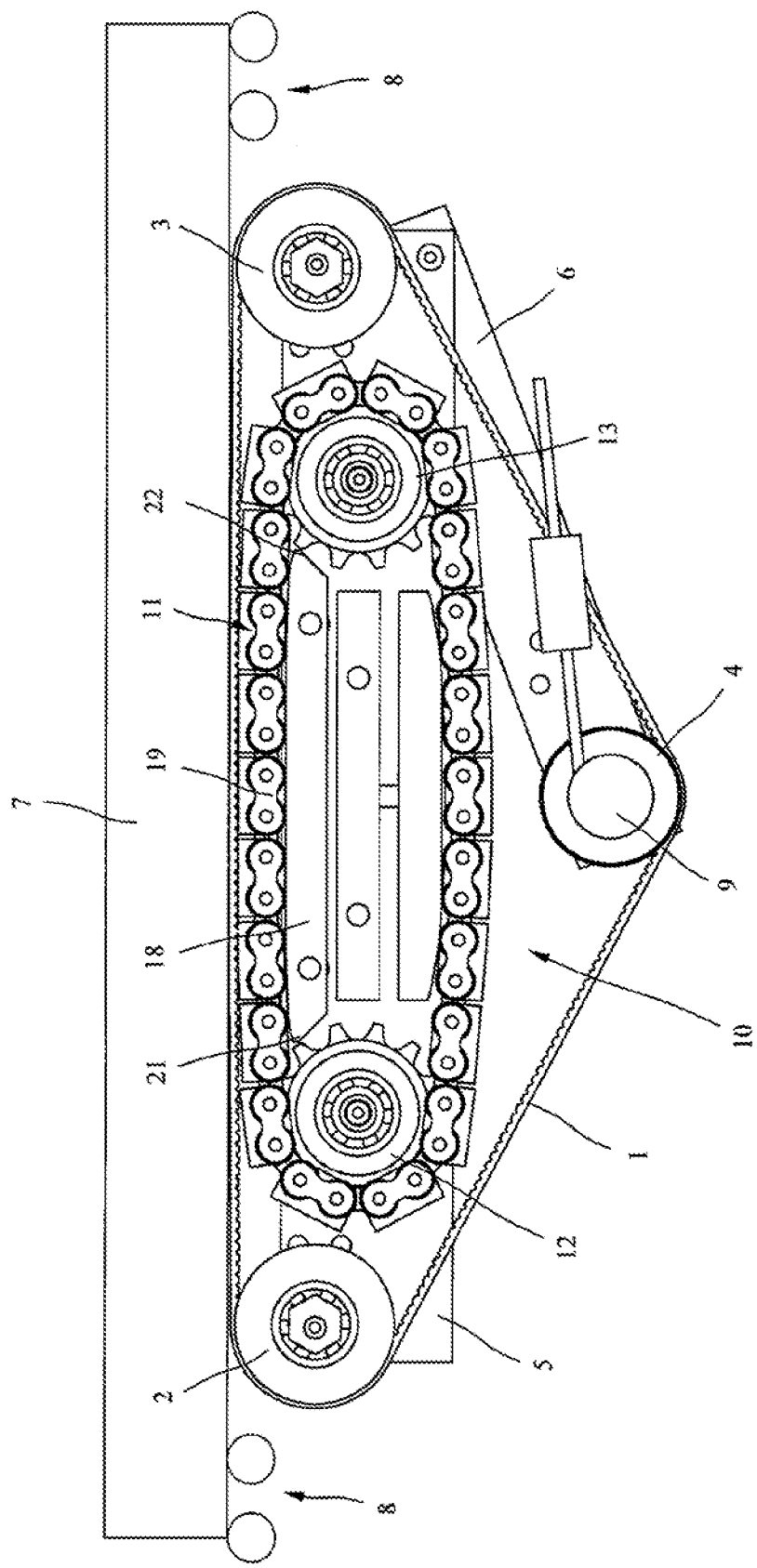
FIG. 2 is a side view of the belt arrangement according to FIG. 1.

The belt arrangement illustrated in the form of different views in FIGS. 1 and 2 comprises a belt 1 that is realized in the form of an endless toothed belt in this case and guided over two upper deflection pulleys 2 and 3 that lie in one plane, as well as over a lower deflection pulley 4 that is arranged underneath the two deflection pulleys 2 and 3. The two upper deflection pulleys 2 and 3 are rotatably supported on a supporting rail 5 while the lower deflection pulley 4 is rotatably supported on the free end of a motion link 6 that is pivotably arranged on the supporting rail 5. The motion link 6 may be prestressed by means of a not-shown spring or pressed downward due to its own weight in order to guide the belt 1 in a tensioned fashion.

The upper deflection pulleys 2 and 3, as well as the lower deflection pulley 4, are realized in the form of toothed pulleys that can positively engage with the belt 1 in the form of an endless toothed belt. The belt arrangement is realized in such a way that the region or section of the belt 1 extending between the two upper deflection pulleys 2 and 3 at least partially contacts the underside of a workpiece 7 that is schematically illustrated in FIG. 2 with its outer side. The workpiece 7 in the form of, e.g., a wooden beam, a wooden board or the like lies on a roller conveyor that is schematically indicated with transport rollers or another suitable workpiece support 8 of a board processing facility or a similar woodworking facility and can be transported along the workpiece support 8 by means of a not-shown transport device in order to be processed. During the movement of the workpiece 7 in the direction of its longitudinal axis, the belt 1 is driven due to its frictional engagement with the underside of the workpiece 7 and can be used for registering the movement of the workpiece 7.

In the exemplary embodiment shown, the belt arrangement therefore forms part of a measuring device for registering the movement of the component 7 that is moved in the longitudinal direction, wherein the lower deflection pulley 4 is connected to a rotary encoder or another suitable sensor 9 for registering the rotational movement of the deflection pulley 4. The movement of the workpiece 7 can be registered by registering the rotational movement of the deflection pulley 4 that is driven by the workpiece 7 via the belt 1. The sensor 9 could also be arranged on the other deflection pulleys 2 and 3.

In order to drive the belt 1 in a largely slip-free fashion during the movement of the workpiece 7, the belt 1 is pressed against the workpiece 7 by a pressing device 10. The pressing device 10 comprises several pressing elements 11 that are moved together with the belt 1 in the transport direction thereof and form part of an endless chain that is guided around two pocket wheels 12 and 13 in the embodiment shown. The pocket wheels 12 and 13 are realized in the form of toothed wheels in the embodiment shown.

Figures 3, 4:
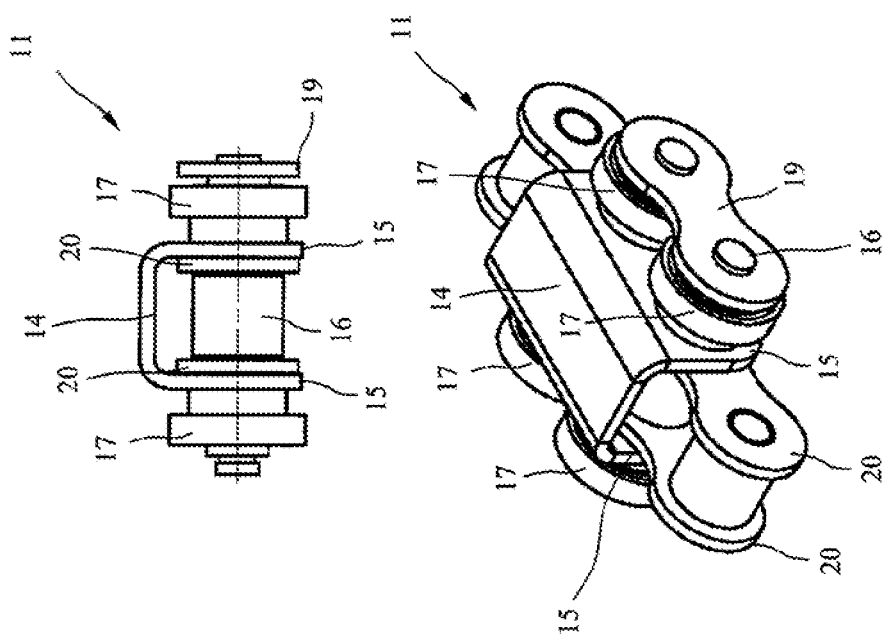
FIG. 3 is a side view of a pressing element.
FIG. 4 is a perspective view of a pressing element.

The pressing elements 11 are illustrated separately in FIGS. 3 and 4 and consist of a U-shaped base body with an upper pressing section 14 and two downwardly protruding limbs 15, wherein two pins 16 extend through said limbs and feature rotatably supported rollers 17 on both sides in order to realize the support on the pressure plate 18 illustrated in FIGS. 1 and 2. The rollers 17 are held by an outer link plate 19 seated on the ends of the pins 16. The pressing elements 11 are interconnected into the endless chain that is guided over the pocket wheels 12 and 13 by means of inner link plates 20 illustrated in FIG. 3.

Due to the rollers 17 that are arranged on the pins 16 to both sides of the pressing element 11, the pressing elements 11 glide on the pressure plate 18 with the least friction and wear possible. The pressure plate 18 arranged between the pocket wheels 12 and 13 is realized in such a way that the pressing elements 11 are pressed against the belt 1 when they pass over the pressure plate 18 and thusly press the belt against the underside of the workpiece 7. For this purpose, the pressure plate 18 is realized in a ramp-shaped fashion with a front ramp surface 21 that obliquely ascends toward the pressing elements 11 in the moving direction of the pressing elements 11 and an obliquely descending rear ramp surface 22.

In the embodiment shown, the above-described belt arrangement is used for measuring the movement of a workpiece in a board processing facility or a similar woodworking facility. The belt arrangement is integrated into a transport bed or another workpiece support of the woodworking facility in such a way that the upper section of the belt 1 comes in contact with, e.g., the underside of the workpiece 7 that lies on the transport bed and is transported in the longitudinal direction. The belt naturally may also come in contact with other lateral surfaces of the workpiece 7. When the workpiece 7 is moved in the longitudinal direction by means of a not-shown transport device, the belt 1 pressed against the underside of the workpiece 7 by the pressing elements 11 is driven due to this frictional engagement and transmits its movement to the deflection pulley 4, on which the sensor 9 for registering the rotational movement of the deflection pulley 4 is arranged. In this way, the movement of the workpiece can be registered and measured. Since the pressing elements 11 are moved together with the belt 1 and no relative movement takes place between the pressing elements 11 and the belt 1, no sliding friction occurs between the pressing elements 11 and the belt 1.

The above-described belt arrangement is not limited to the extensively elucidated application. For example, the belt arrangement could also be used for transporting a workpiece when one or more of the pulleys are driven. The movement of the workpiece can also be measured in this case. Instead of using the belt 1, it would furthermore be possible to use a chain or similar traction elements that are pressed against the workpiece 7 by means of the above-described pressing device 10 and connected to the workpiece 7 in a slip-free fashion by means of suitable frictionally or positively engaging elements.

All references cited herein are expressly incorporated by reference in their entirety. In addition, unless mention was made above to the contrary, it should be noted that all of the accompanying drawings are not to scale. There are many different features to the present invention and it is contemplated that these features may be used together or separately. Thus, the invention should not be limited to any particular combination of features or to a particular application of the invention. Further, it should be understood that variations and modifications within the spirit and scope of the invention might occur to those skilled in the art to which the invention pertains. Accordingly, all expedient modifications readily attainable by one versed in the art from the disclosure set forth herein that are within the scope and spirit of the present invention are to be included as further embodiments of the present invention.

The invention claimed is:

1. A woodworking facility with a workpiece support and a belt or chain arrangement for registering movement of a workpiece that lies on the workpiece support and is transported thereon in order to be processed, wherein the belt or chain arrangement comprises a belt or chain that is guided over at least two deflection pulleys and designed for contacting the workpiece and a sensor arranged on at least one of the two deflection pulleys in order to register rotational movement of the deflection pulley, wherein the belt or chain can be pressed against the workpiece transverse to a moving direction of the belt or the chain by a pressing device assigned to the belt or to the chain, wherein the deflection pulleys and the pressing device are arranged on a vertically movable support, and wherein the pressing device comprises several pressing elements that are moved together with the belt or the chain in the moving direction thereof without relative movement occurring between the several pressing elements and the belt or the chain.

2. The woodworking facility according to claim 1, wherein the pressing elements are interconnected into an endless chain and guided over at least two pocket wheels.

3. The woodworking facility according to claim 2, wherein the pocket wheels are arranged between deflection pulleys of the belt or chain.

4. The woodworking facility according to claim 1, wherein the pressing elements are interconnected by link plates.

5. The woodworking facility according to claim 1, wherein the pressing elements are pressed against an inner side of the belt or chain by a pressure plate.

6. The woodworking facility according to claim 1, further comprising rotatably-supported rollers arranged on the pressing elements.

7. The woodworking facility according to claim 6, wherein each of the pressing elements comprises a U-shaped base body with an upper pressing section and two downwardly-protruding limbs, wherein two pins extend through the downwardly-protruding limbs and include rotatably-supported rollers on both sides.

8. The woodworking facility according to claim 1, wherein the belt or the chain is guided over the two deflection pulleys that are arranged in one plane and over a third deflection pulley.

9. The woodworking facility according to claim 8, wherein the third deflection pulley is arranged on a free end of a pivotably-supported motion link.

10. The woodworking facility according to claim 1, further comprising a sensor arranged on the belt or the chain in order to register movement of the belt or the chain.

11. The woodworking facility according to claim 5, wherein the pressure plate is pivotable about a horizontal axis.

12. A woodworking facility with a workpiece support and a belt or chain arrangement for registering movement of a workpiece that lies on the workpiece support and is transported thereon in order to be processed, wherein the belt or chain arrangement comprises a belt or chain that is guided over at least two deflection pulleys and designed for contacting the workpiece, wherein the belt or chain can be pressed against the workpiece transverse to a moving direction of the belt or the chain by a pressing device assigned to the belt or to the chain, wherein the pressing device comprises several pressing elements that are moved together with the belt or the chain in the moving direction thereof, wherein each of the pressing elements comprises a U-shaped base body with an upper pressing section and two downwardly-protruding limbs, wherein two pins extend through the downwardly-protruding limbs, and wherein rotatably-supported rollers are arranged on both sides of the pressing elements.

13. The woodworking facility according to claim 12, wherein the pressing elements are interconnected into an endless chain and guided over at least two pocket wheels, the pocket wheels arranged between deflection pulleys of the belt or chain.

14. The woodworking facility according to claim 12, wherein the pressing elements are interconnected by link plates and are pressed against an inner side of the belt or chain by a pressure plate, the pressure plate pivotable about a horizontal axis.

15. The woodworking facility according to claim 12, wherein the belt or the chain is guided over the two deflection pulleys arranged in one plane and over a third deflection pulley, wherein the third deflection pulley is arranged on a free end of a pivotably-supported motion link.

16. The woodworking facility according to claim 15, further comprising a sensor arranged on at least one of the deflection pulleys in order to register rotational movement of the deflection pulley or a sensor arranged on the belt or chain in order to register movement of the belt or the chain.

17. The woodworking facility according to claim 12, wherein the deflection pulleys and the pressing device are arranged on a vertically-movable support.

18. A woodworking facility with a workpiece support and a belt or chain arrangement for registering movement of a workpiece that lies on the workpiece support and is transported thereon in order to be processed, wherein the belt or chain arrangement comprises a belt or chain that is guided over two upper deflection pulleys that lie in one plane and over a lower deflection pulley arranged under the two upper deflection pulleys, the two upper deflection pulleys rotatably supported on a support rail and the lower deflection pulley rotatably supported on a free end of a motion link pivotably arranged on the support rail and a sensor arranged on at least one of the deflection pulleys in order to register rotational movement of the deflection pulley, wherein the belt or chain can be pressed against the workpiece transverse to a moving direction of the belt or the chain by a pressing device assigned to the belt or to the chain, and wherein the pressing device comprises several pressing elements that are moved together with the belt or the chain in the moving direction thereof without relative movement occurring between the several pressing elements and the belt or the chain.

* * * * *